United States Patent
Curtis et al.

(10) Patent No.: US 9,172,266 B2
(45) Date of Patent: Oct. 27, 2015

(54) POWER SYSTEMS FOR TOUCH FREE DISPENSERS AND REFILL UNITS CONTAINING A POWER SOURCE

(71) Applicant: GOJO Industries, Inc., Akron, OH (US)

(72) Inventors: Chip W. Curtis, West Dundee, OH (US); Jackson W. Wegelin, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 13/770,360

(22) Filed: Feb. 19, 2013

(65) Prior Publication Data

US 2014/0234140 A1 Aug. 21, 2014

(51) Int. Cl.
| | | |
|---|---|---|
| B65D 88/54 | (2006.01) | |
| H02J 7/00 | (2006.01) | |
| F04B 17/03 | (2006.01) | |
| H02M 3/02 | (2006.01) | |
| A47K 5/12 | (2006.01) | |

(Continued)

(52) U.S. Cl.
CPC ............ *H02J 7/0054* (2013.01); *A47K 5/1217* (2013.01); *A47K 5/14* (2013.01); *A47K 5/16* (2013.01); *F04B 17/03* (2013.01); *H02J 7/0063* (2013.01); *H02J 7/345* (2013.01); *H02M 3/02* (2013.01); *H02J 2007/0067* (2013.01)

(58) Field of Classification Search
CPC ....... H02J 7/0054; H02J 7/0063; H02J 7/345; H02J 2007/0067; A47K 5/1217; A47K 5/14; A47K 5/16; F04B 17/03; H02M 3/02

USPC ........ 222/52, 63, 181.1–181.3, 325; 307/110; 320/103

See application file for complete search history.

(56) References Cited

U.S. PATENT DOCUMENTS

| | | |
|---|---|---|
| 5,379,917 A | 1/1995 | Brown et al. |
| 5,492,247 A | 2/1996 | Shu et al. |

(Continued)

FOREIGN PATENT DOCUMENTS

WO 2014031816 A1 2/2014

OTHER PUBLICATIONS

International Search Report and Written Opinion from International Application No. PCT/US2014/014756, date of mailing Jun. 2, 2014.

*Primary Examiner* — Patrick M Buechner
(74) *Attorney, Agent, or Firm* — Calfee, Halter & Griswold LLP (57) ABSTRACT

Electronic dispensers and refill units for electronic dispensers. An exemplary electronic dispenser includes a housing, a processor and a first battery secured to the dispenser. The first battery provides power to the processor. The dispenser further includes actuator drive circuitry for causing the dispenser to move an actuator to dispense fluid from a refill unit. In addition, the dispenser includes a rechargeable energy storage device for providing power to the actuator drive circuitry. Circuitry for charging the rechargeable energy storage device is also provided. The dispenser includes a holder for holding a refill unit and a connector for releasably connecting to a second battery that is provided with the refill unit. The second battery is installed in the connector when a refill unit is installed in the dispenser and removed from the connector when the refill unit is removed from the dispenser.

19 Claims, 6 Drawing Sheets

(51) Int. Cl.
  *A47K 5/14* (2006.01)
  *A47K 5/16* (2006.01)
  *H02J 7/34* (2006.01)

(56) References Cited

U.S. PATENT DOCUMENTS

| | | | |
|---|---|---|---|
| 5,836,482 A | 11/1998 | Ophardt et al. | |
| 6,209,752 B1 | 4/2001 | Mitchell et al. | |
| 8,100,299 B2 * | 1/2012 | Phelps et al. | 222/180 |
| 8,302,812 B2 * | 11/2012 | Reynolds | 222/63 |
| 8,385,093 B2 * | 2/2013 | Trattler et al. | 363/60 |
| 8,573,447 B2 * | 11/2013 | Muderlak et al. | 222/153.03 |
| 8,816,536 B2 * | 8/2014 | Borke et al. | 307/104 |
| 2006/0124662 A1 | 6/2006 | Reynold | |
| 2007/0056993 A1 * | 3/2007 | Brown et al. | 222/192 |
| 2009/0069749 A1 | 3/2009 | Miller et al. | |
| 2010/0282772 A1 * | 11/2010 | Ionidis | 222/1 |
| 2011/0056991 A1 * | 3/2011 | Brown et al. | 222/181.3 |
| 2012/0031930 A1 * | 2/2012 | Fileccia et al. | 222/325 |
| 2012/0074894 A1 * | 3/2012 | Chen et al. | 320/103 |
| 2012/0241470 A1 | 9/2012 | Snodgrass et al. | |
| 2013/0001250 A1 | 1/2013 | Wegelin et al. | |

* cited by examiner

POWER SYSTEMS FOR TOUCH FREE DISPENSERS AND REFILL UNITS CONTAINING A POWER SOURCE

TECHNICAL FIELD

The present invention relates generally to touch free dispenser systems and more particularly to power systems for touch free dispensers, as well as disposable refill units that container a power source.

BACKGROUND OF THE INVENTION

Many touch free dispensers are powered by a plurality of batteries, such as 3-4 "D" or "C" size batteries. As the touch-free dispenser is used, the battery power is depleted and a maintenance worker must open up the dispenser and replace the batteries. This requires maintenance personnel to stock batteries and identify whether a touch-free dispenser has stopped working because the batteries need to be replaced or if there is another problem with the dispenser.

SUMMARY

Electronic dispensers and refill units for electronic dispensers are disclosed herein. An exemplary electronic dispenser includes a housing, a processor and a first battery secured to the dispenser. The first battery provides power to the processor. The dispenser further includes actuator drive circuitry for causing the dispenser to move an actuator to dispense fluid from a refill unit. In addition, the dispenser includes a rechargeable energy storage device for providing power to the actuator drive circuitry. Circuitry for charging the rechargeable energy storage device is also provided. The dispenser includes a holder for holding a refill unit and a connector for releasably connecting to a second battery that is provided with the refill unit. The second battery is installed in the connector when a refill unit is installed in the dispenser and removed from the connector when a refill unit is removed from the dispenser. Preferably, the voltage of the second battery is less than the voltage required to operate the pump actuator.

An exemplary refill unit includes a container for holding a fluid, a pump for pumping fluid from the container and a disposable battery provided with the refill unit. The disposable battery has a voltage that is less than the voltage required to operate an electrically operated actuator in a dispenser to operate the pump.

Another exemplary electronic dispenser includes a housing, actuator drive circuitry for driving a pump, a processor and a first power source for powering the processor. In addition, the dispenser includes a plurality of capacitors and capacitor control circuitry. The capacitor control circuitry charges the plurality of capacitors in parallel and places the plurality of capacitors in series to power the actuator charge circuitry. The dispenser further includes circuitry for electrically coupling to a second battery that is installed with and removable with a refill unit, and the second battery supplies the power required to charge the plurality of capacitors.

BRIEF DESCRIPTION OF THE DRAWINGS

These and other features and advantages of the present invention will become better understood with regard to the following description and accompanying drawings in which.

DETAILED DESCRIPTION

The following includes definitions of exemplary terms used throughout the disclosure. Both singular and plural forms of all terms fall within each meaning Except where noted otherwise, capitalized and non-capitalized forms of all terms fall within each meaning:

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

The values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

Figure 1:
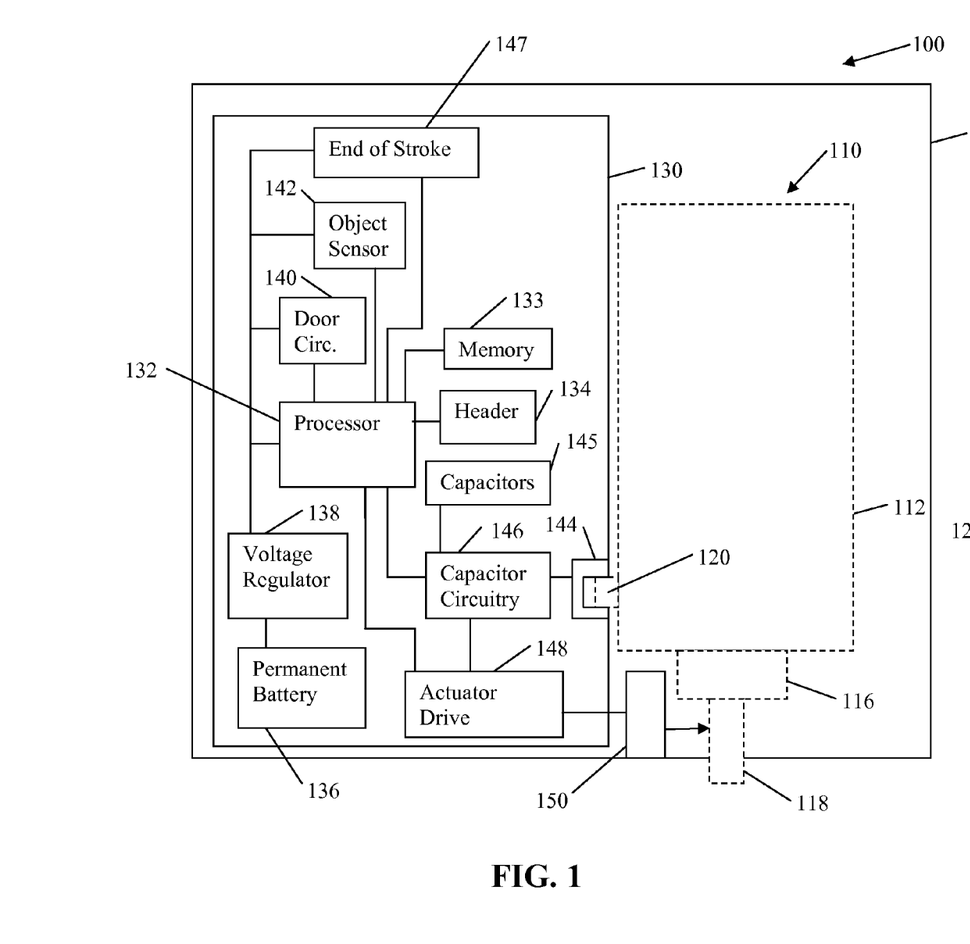
FIG. 1 is a generic illustrative schematic of an exemplary dispenser having a power system that receives dispensing power from a power source inserted and removed with a refill unit.

FIG. 1 illustrates a dispenser 100 having an exemplary inventive power system. Dispenser 100 includes a housing 102. Located within housing 102 is a system circuitry 130. System circuitry 130 may be on a single circuit board or may be on multiple circuit boards. In addition, some of the circuitry may not be on a circuit board, but rather individually mounted and electrically connected to the other components as required. In this embodiment, system circuitry 130 includes a processor 132, memory 133, a header 134, a permanent power source 136, a voltage regulator 138, door switch circuitry 140, an object sensor 142, end of stroke circuitry 147, actuator drive circuitry 148, a bank of capacitors 145, capacitor control circuitry 146 and replaceable power source interface receptacle 144.

Processor 132 may be any type of processor, such as, for example, a microprocessor or microcontroller, discrete logic, such as an application specific integrated circuit (ASIC), other programmed logic device or the like. Processor 132 is in circuit communication with header 134. Header 134 is an in circuit connection port so that a user can connect to system circuitry 130 to program the circuitry, run diagnostics on the circuitry and/or retrieve information from the circuitry. Processor 132 is in circuit communication with memory 133. Memory 133 may be any type of memory, such as, for example, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some embodiments, the memory 133 is separate from the processor 132, and in some embodiments, the memory 133 resides on or within processor 132.

A permanent power source 136, such as, for example, one or more batteries, is also provided. The permanent power source 136 is preferably designed so that the permanent power source 136 does not need to be replaced for the life of the dispenser 100. The permanent power source 136 is in circuit communication with voltage regulator circuitry 138. In one exemplary embodiment, voltage regulator circuitry 138 provides regulated power to processor 132, object sensor 142, end of stroke detection circuitry 147 and door circuitry 140. Permanent power source 136 may be used to provide power to other circuitry that requires a small amount of power and will not drain the permanent power source 136 prematurely.

Processor 132 is in circuit communication with door circuitry 140 so that processor 132 knows when the dispenser 100 door (not shown) is closed. In some embodiments, processor 132 will not allow the dispenser 100 to dispense a dose if the door is open. Door circuitry 140 may be any type of circuitry, such as, for example, a mechanical switch, a magnetic switch, a proximity switch or the like. Processor 132 is also in circuit communication with an object sensor 142 for detecting whether an object is present in the dispense area. Object sensor 142 may be any type of passive or active object sensor, such as, for example, an infrared sensor and detector, a proximity sensor, an imaging sensor, a thermal sensor or the like. Processor 132 is in circuit communication with actuator drive circuitry 148. Actuator drive circuitry 148 causes a motor and associated gearing 150 to operate a foam pump 114 located on a refill unit 110. In addition, end of stroke detection circuitry 147 is in circuit communication with processor 132 and provides processor 132 with information relating to the end of stroke for the foam pump 114 so that the processor 132 can determine when to stop the motor and associated gearing. The end of stroke circuitry 147 may include, for example, an encoder, a physical switch, a magnetic switch, software algorithm or the like.

Figure 2:
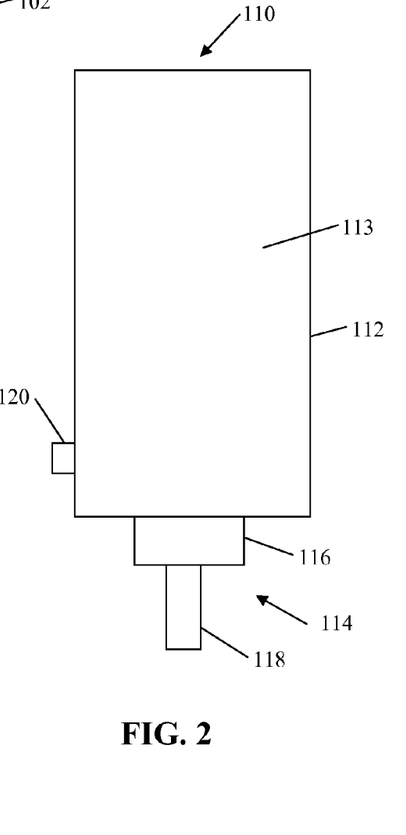
FIG. 2 is an exemplary refill unit having a power source for use in the exemplary dispenser of FIG. 1.

In this exemplary embodiment, refill unit 110 is shown in phantom lines inserted in the dispenser 100 in FIG. 1 and is also illustrated in solid lines in FIG. 2. Thus, this illustrates that refill unit 110 is inserted into dispenser 100 and removed from dispenser 100 as a unit. Refill unit 110 includes a container 112, a foam pump 114 that includes an air compressor 116 and an outlet 118. Refill unit 110 also includes a foamable liquid 113, such as, for example, a foamable soap, sanitizer, lotion, moisturizer or other liquid used for personal hygiene. In some embodiments, refill unit 110 is for use in a liquid dispenser, rather than a foam dispenser, and filled with liquid that is not foamed. Accordingly, air compressor 116 is not required.

In addition, refill unit 110 includes a replaceable power source 120. Replaceable power source 120 may be any power source, such as, for example, a single "AA" battery. The replaceable power source 120 does not contain enough power to directly power motor and associated gearing 150 to dispense the contents of the refill unit 110. Replaceable power source 120 is inserted into dispenser 100 with refill unit 110 and is removed from dispenser 100 with refill unit 110. Preferably refill unit 110 has replaceable power source 120 affixed thereto; however, in some embodiments, the replaceable power source 120 is provided with the refill unit 110. In either case, however, the replaceable power source 120 is provided with and removed with the refill unit 110.

System circuitry 130 also includes a bank of capacitors 145 and capacitor control circuitry 146 in circuit communication with processor 132. The bank of capacitors 145 and capacitor control circuitry 146 is in circuit communication with replaceable power source interface receptacle 144 and actuator drive 148. Replaceable power source interface receptacle 144 is configured to receive and/or otherwise electrically couple with replaceable power source 120 when a refill unit 110 is inserted in the dispenser 100.

During operation, when a refill unit 110 is inserted into dispenser 100, processor 132 and capacitor control circuitry 146 cause the bank of capacitors 145 to charge in parallel. In one exemplary embodiment, there are three capacitors. Preferably, the capacitors are oversized for the required power to power the motor and associated gearing 150 to dispense a dose of foam. The oversized capacitors are preferably charged to a point that is less than the fully charged values of the capacitors. Because the bank of capacitors 145 is charged to less than full capacity, there is less discharge in the capacitors when they are idle for a period of time. In some embodiments, the capacitors are charged to less than about 50% of their full capacity. In some embodiments, the capacitors are charged to less than about 75% of their full capacity. In some embodiments, the capacitors are charged to less than about 90% of their full capacity.

When the processor 132, through object sensor 142, determines that an object is within the dispense zone, the processor 132 causes the capacitor control circuitry 146 to place the capacitors 145 in series to provide power to the actuator drive circuitry 148 to power the motor and associated gearing 150 to operate foam pump 114. Once a dose has been dispensed, processor 132 checks the charge on the capacitors 145. If the charge is below a threshold, the processor 132 causes the capacitor control circuitry 146 to charge the capacitors 145. The capacitors 145 are charged in parallel.

In some embodiments, the processor 132 monitors the amount of fluid left in the refill unit 110. The processor 132 may monitor the amount of fluid by detecting the fluid level, for example, with a level sensor, with a proximity sensor, with an infrared detection, by counting the amount of doses dispensed and comparing that to a total number of dispenses for the refill unit or the like. When the processor 132 determines that the refill unit 110 is empty, or close to being empty, the processor 132 causes the replaceable power source 120 to charge the capacitors 145 up to their maximum charge, or to charge the capacitors 145 up until the replaceable power source 120 is completely drained or drained as far as possible. Thus, when the refill unit 110 and replaceable power source 120 is removed, as much energy as possible has been removed from the replaceable power source 120.

Figure 3A:
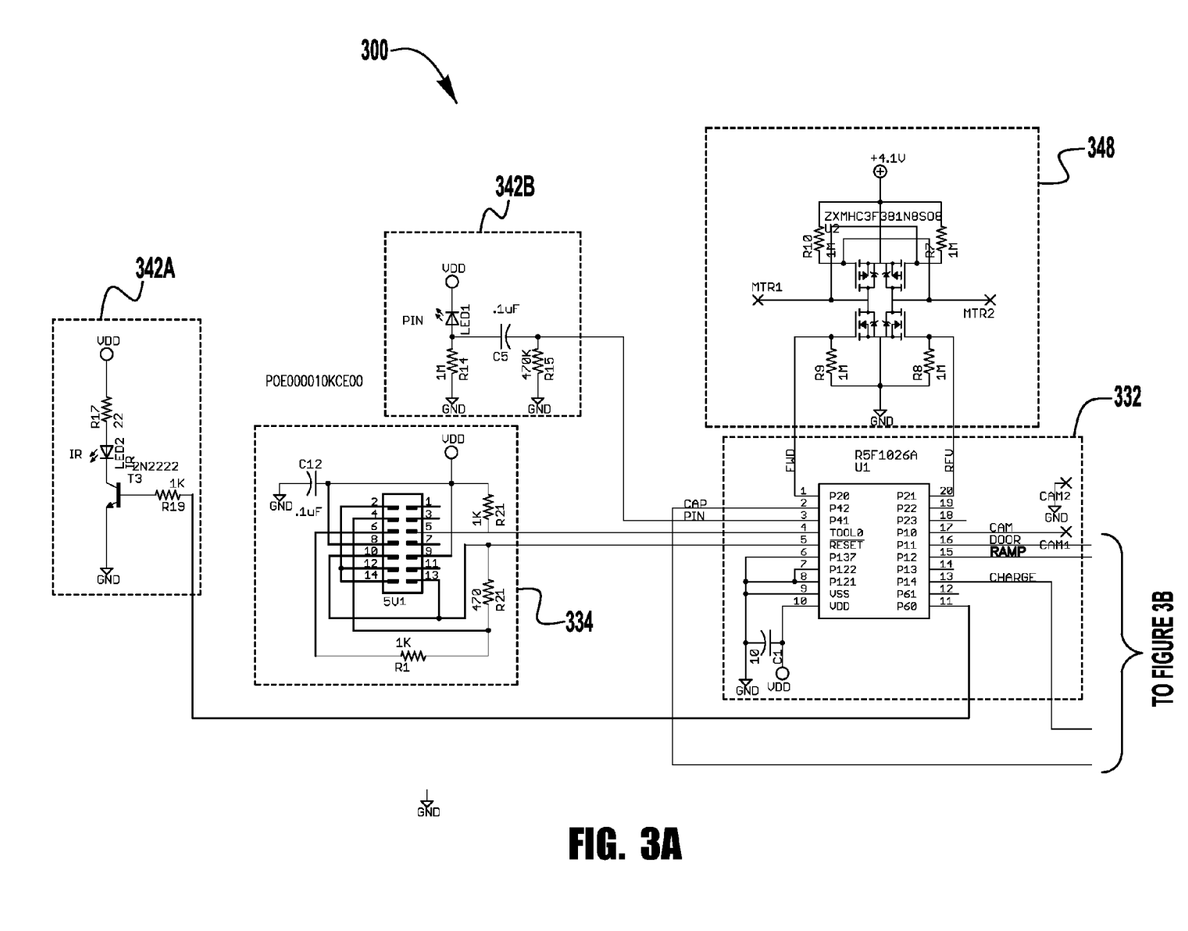
FIGS. 3A and B are a circuit diagram of an exemplary power system for use in the exemplary dispenser of FIG. 1.
Figure 3B:
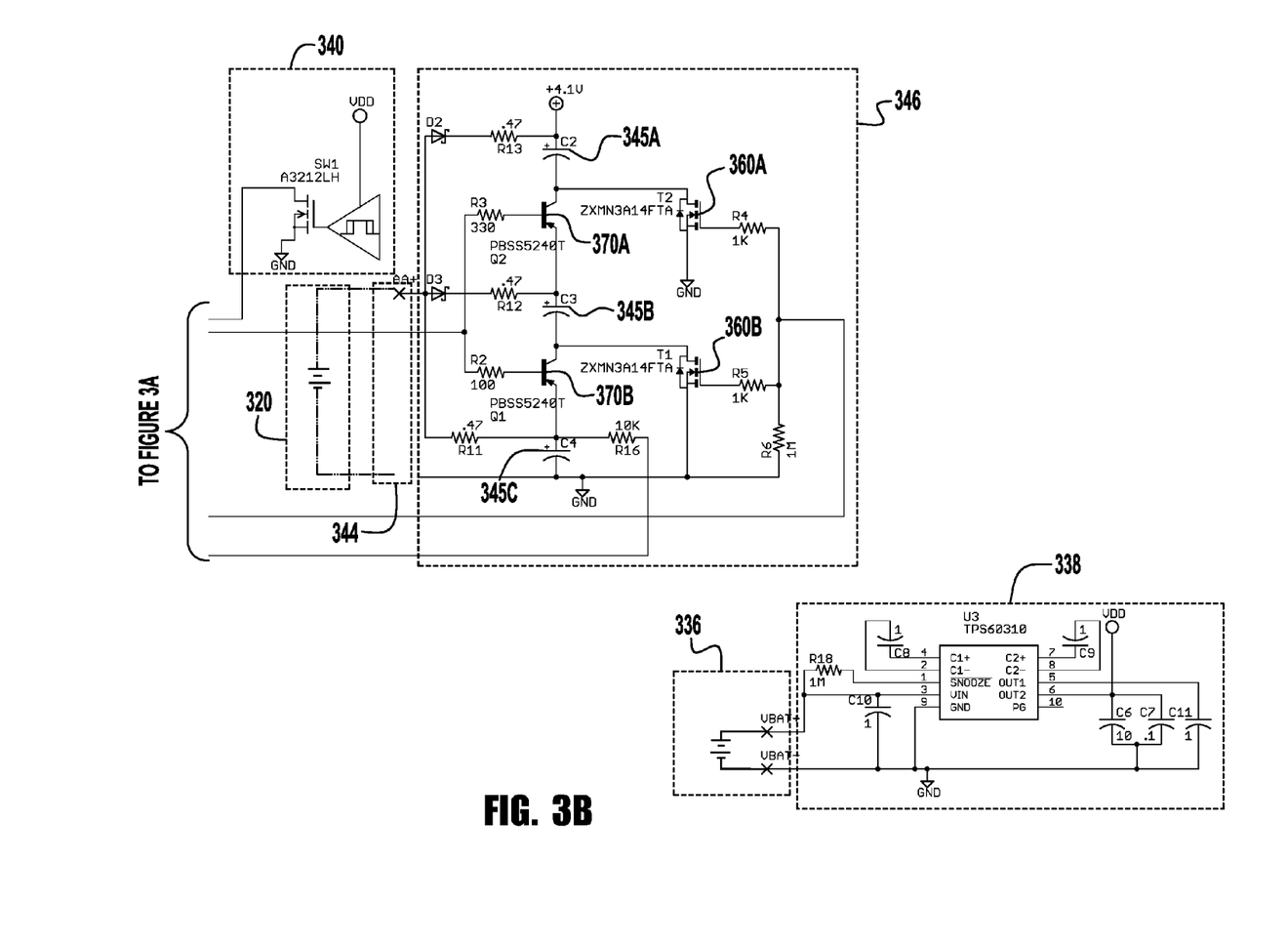

FIGS. 3A and 3B illustrate an exemplary embodiment of circuit diagram for a power system 300. Power system 300 includes a processor 332 in circuit communication with actuator drive circuitry 348, object sensor emitter 342A and receiver 342B, door circuitry 340, capacitor control circuitry 346 and voltage regulator 338. The physical connection between voltage regulator circuitry 338 and processor 332, object sensor emitter 342A, receiver 342B, door circuitry 340, and header 334 are not shown for purposes of clarity; however, inputs for those devices that are labeled with "VDD" receive power from voltage regulator 338. Voltage regulator 338 receives power from permanent battery 336, which is permanently connected to the dispenser circuitry. Replaceable battery 320 is secured to a refill unit (not shown) and releasably connects to capacitor control circuitry 346 through replaceable power source interface receptacle 344 when the refill unit is installed in the dispenser and in circuit communication with power system 300.

In this exemplary embodiment, processor 332 is a microprocessor part no. R5F1026A, object sensor emitter 342A is an infrared emitter, object sensor receiver 342B is an infrared receiver, header 334 is a 14-pin in-circuit programmer, part no. R0E000010KCE00, voltage regulator 338 is a single-cell dual output high-efficiency charge pump part no. TPS60310, permanent battery 336 is a size "C" battery, actuator drive circuitry 348 includes a mosfet H-bridge part no. ZXMHC3F381N8SO8 and door circuitry 340 is magnetic door switch.

Capacitor control circuitry 346 controls the charging and discharging of capacitors 345A, 345B, 345C. Charging voltage is supplied by replaceable power source 320 (which is connected to a refill unit) when a refill unit is installed in a dispenser. Processor 332 places replaceable power source 320 in parallel with capacitors 345A, 345B, 345C by turning on transistors 360A and 360B. When the capacitors have a sufficient charge, which may be determined by the length of time the capacitors are charged, or through a charging feedback to the processor, transistors 360A and 360B are turned off. When the processor determines that a dispense event is required, transistors 370A and 370B are turned on, which places the capacitors 345A, 345B, and 345C in series. The capacitors 345A, 345B and 345C in series have an output voltage of about +4.1 volts, which is provided to an input of actuator drive circuitry 348.

Figures 4, 5:
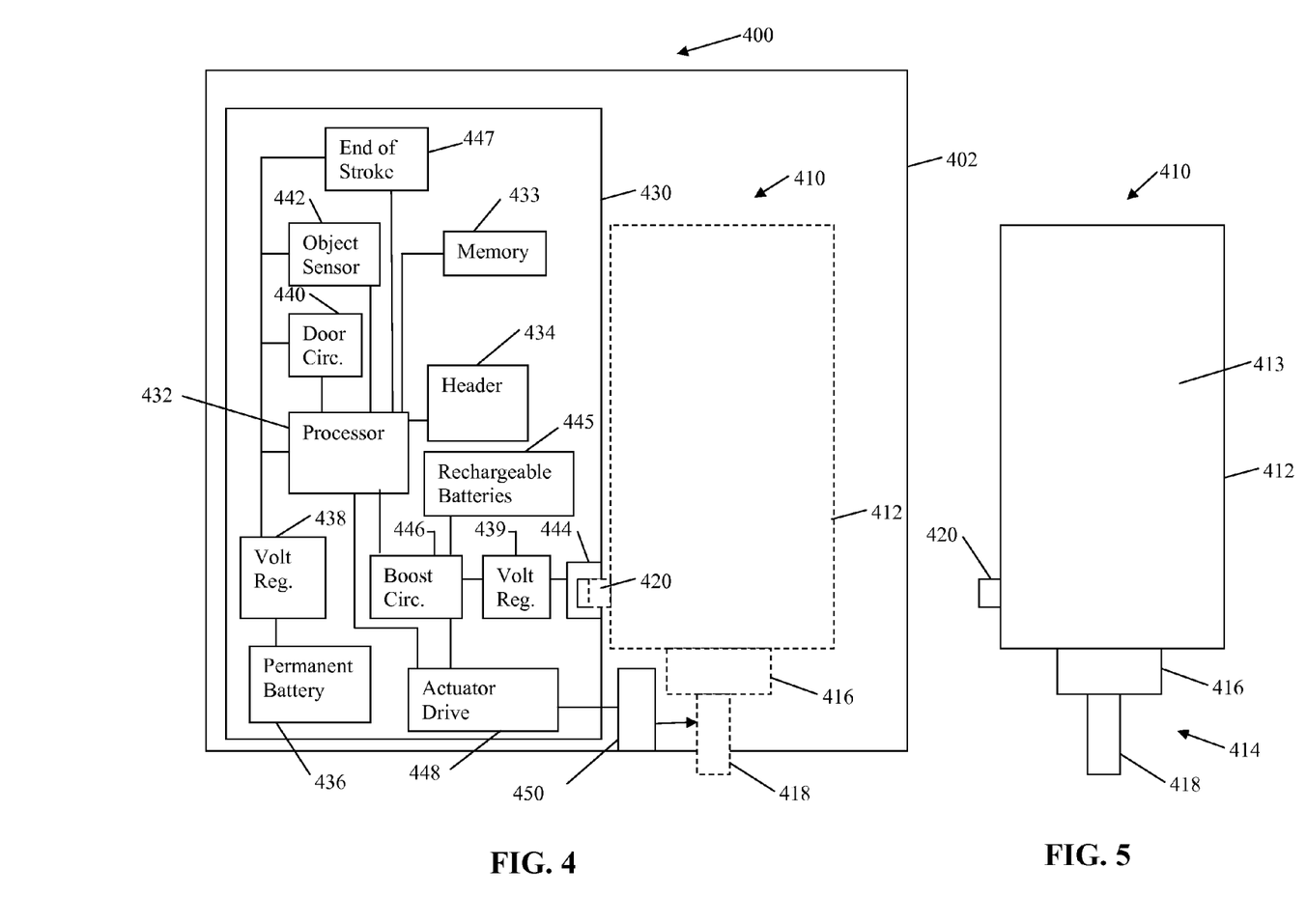
FIG. 4 is a generic illustrative schematic of an exemplary dispenser having a power system that receives dispensing power from a power source inserted and removed with a refill unit.
FIG. 5 is an exemplary refill unit having a power source for use in the exemplary dispenser of FIG. 4.

FIG. 4 illustrates a dispenser 400 having an exemplary inventive power system. Dispenser 400 includes a housing 402. Located within housing 402 is system circuitry 430. System circuitry 430 may be on a single circuit board or may be on multiple circuit boards. In addition, some of the circuitry may not be on a circuit board, but rather individually mounted and electrically connected to the other components as required. In this embodiment, system circuitry 430 includes a processor 432, memory 433, a header 434, a permanent power source 436, a voltage regulator 438, door switch circuitry 440, an object sensor 442, end of stroke circuitry 447, one or more rechargeable batteries 445, boost circuitry 446, voltage regulator 439 and replaceable power source interface receptacle 444.

Processor 432 may be any type of processor, such as, for example a microprocessor or microcontroller, discrete logic, such as an application specific integrated circuit (ASIC), other programmed logic device or the like. Processor 432 is in circuit communication with header 434. Header 434 is a connection port so that a user can connect to system circuitry 430 to program the circuitry, run diagnostics on the circuitry and/or retrieve information from the circuitry. Processor 432 is in circuit communication with memory 433. Memory 433 may be any type of memory, such as, for example, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some embodiments, the memory 433 is separate from the processor 432, and in some embodiments, the memory 433 resides on or within processor 432.

A permanent power source 436, such as, for example, one or more batteries are also provided. The permanent power source 436 is preferably designed so that the permanent power source 436 does not need to be replaced for the life of the dispenser 400. The permanent power source 436 is in circuit communication with voltage regulator circuitry 438. In one exemplary embodiment, voltage regulator circuitry 438 provides regulated power to processor 432, object sensor 442, end of stroke detection circuitry 447, and door circuitry 440. Permanent power source 436 may be used to provide power to other circuitry that requires a small amount of power and will not drain the permanent power source 436 prematurely.

Processor 432 is in circuit communication with door circuitry 440 so that processor 432 knows when the dispenser 400 door (not shown) is closed. In some embodiments, processor 432 will not allow the dispenser 400 to dispense a dose if the door is open. Door circuitry 440 may be any type of circuitry, such as, for example, a mechanical switch, a magnetic switch, a proximity switch or the like. Processor 432 is also in circuit communication with an object sensor 442 for detecting whether an object is present in the dispense area. Object sensor 442 may be any type of passive or active object sensor, such as, for example, an infrared sensor and detector, a proximity sensor, an imaging sensor, a thermal sensor or the like. Processor 432 is in circuit communication with actuator drive circuitry 448. Actuator drive circuitry 448 causes a motor and associated gearing 450 to operate a foam pump 414 located on a refill unit 410. In addition, end of stroke detection circuitry 447 is in circuit communication with processor 432 and provides processor 432 with information relating to the end of stroke for the foam pump 414 so that the processor 432 can determine when to stop the motor and associated gearing 450. The end of stroke circuitry 447 may include, for example, an encoder, a physical switch, a magnetic switch, software algorithm or the like.

In this exemplary embodiment, refill unit 410 is shown in phantom lines inserted in the dispenser in FIG. 4 and also illustrated in solid lines in FIG. 5. Refill unit 410 includes a container 412, a foam pump 414 that includes an air compressor 416 and an outlet 418. Refill unit 410 also includes a foamable liquid 413, such as, for example, a foamable soap, sanitizer, lotion, moisturizer or other liquid used for personal hygiene. In addition, refill unit 410 includes a replaceable power source 420. Replaceable power source 420 may be any power source, such as, for example, a single "AA" battery. The replaceable power source 420 does not have a high enough voltage to directly power motor and associated gearing 450 to dispense the contents of the refill unit 410. Replaceable power source 420 is inserted into dispenser 400 with refill unit 410 and is removed from dispenser 400 with refill unit 410.

System circuitry 430 also includes one or more replaceable batteries 445, such as, for example, NIMH batteries, and boost circuitry 446 in circuit communication with processor 432. A voltage regulator 439 is in circuit communication with replaceable power source interface receptacle 444. Replaceable power source interface receptacle 444 is configured to receive and/or otherwise electrically couple with replaceable power source 420 when a refill unit 410 is inserted in the dispenser 400. Voltage regulator 439 provides a regulated voltage output to boost circuitry 446 and charging circuitry for charging the one or more rechargeable batteries 445.

In some embodiments, the boost circuitry uses the regulated voltage from voltage regulator 439 supplied by replaceable power source 420 in parallel with the voltage supplied by the rechargeable batteries 445 to provide a base voltage to the boost circuitry 446. The boost circuitry 446 boosts the voltage from, for example, 2 volts to 4.1 volts, and the 4.1 volt output is provided to actuator drive 448 to power motor and associated gearing 450 for operation of foam pump 414.

During operation, when a refill unit 410 is inserted into dispenser 400, the rechargeable batteries 445 begin to recharge. In one exemplary embodiment, the rechargeable batteries are oversized for the required power to power the motor and associated gearing 450 to dispense a dose of foam. The oversized capacity of the batteries is preferably charged to a point that is less than the fully rated capacity of the batteries 445. Because the batteries 445 are charged to less than full capacity, there is less discharge in the batteries when they are idle for a period of time. In some embodiments, the rechargeable batteries 445 are charged to less than about 50% of their full capacity. In some embodiments, the rechargeable batteries 445 are charged to less than about 75% of their full capacity. In some embodiments, the rechargeable batteries 445 are charged to less than about 90% of their full capacity.

When the processor 432, through object sensor 442, determines that an object is within the dispense zone, the processor 432 causes the boost circuitry 446 to boost the voltage being supplied by the replaceable power source 420 and rechargeable batteries 445 to power to the actuator drive circuitry 448 to power the motor and associated gearing 450 to operate foam pump 414.

In some embodiments, the processor 432 monitors the amount of fluid left in the refill unit. The processor 432 may monitor the amount of fluid by detecting the fluid level, for example, with a level sensor, with a proximity sensor, with an infrared detection, by counting the amount of doses dispensed and comparing that to a total number of dispenses for the refill unit or the like. When the processor 432 determines that the refill unit 410 is empty, or close to being empty, the processor 432 causes the replaceable power source 420 to charge the rechargeable batteries 445 up to their maximum charge, or to charge the rechargeable batteries 445 up until the replaceable power source 420 is completely drained, or drained as far as possible. Thus, when the refill unit 410 and replaceable power source 420 is removed, as much energy as possible has been removed from the replaceable power source 420.

Figure 6A:
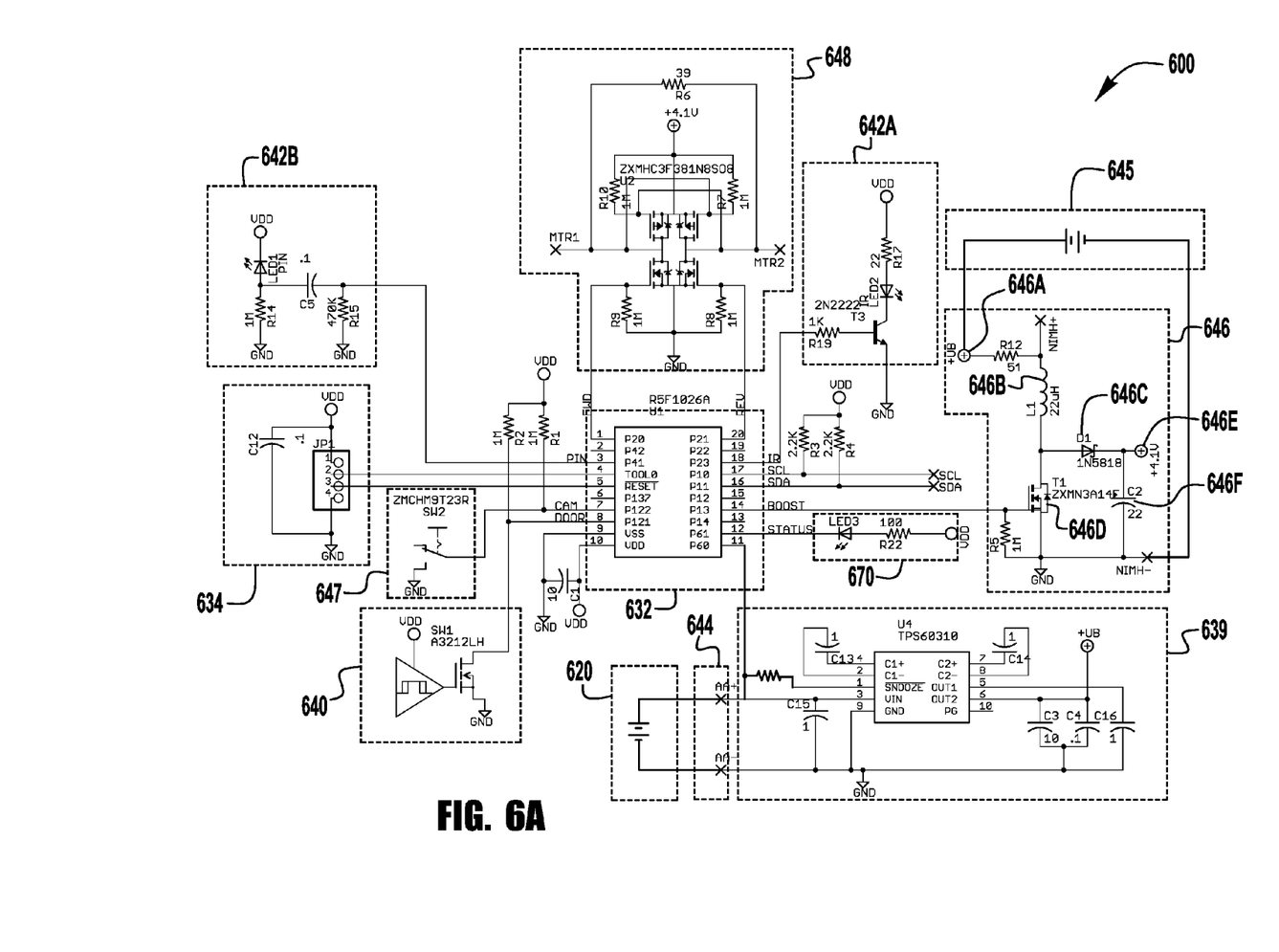
FIGS. 6A and 6B are a circuit diagram of an exemplary power system for use in the exemplary dispenser of FIG. 4.
Figure 6B:
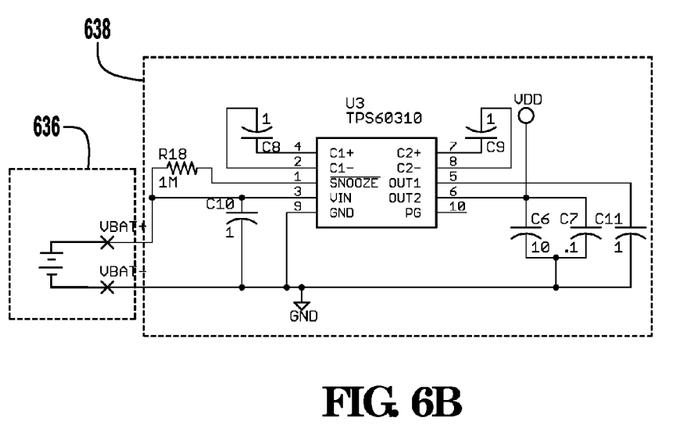

FIG. 6 illustrates an exemplary embodiment of a power system 600 for a dispenser. Power system 600 includes a processor 632 which is in circuit communication with header 634, actuator drive circuitry 648, object sensor emitter 642A and receiver 642B, door circuitry 640, end of stroke circuitry 647, boost circuitry 646, voltage regulator 638 and voltage regulator 639. The physical connection between voltage regulator circuitry 638 and processor 632, object sensor emitter 642A, receiver 642B, door circuitry 640, end of stroke detector 647 and header 634 are not shown for purposes of clarity; however, inputs for those devices that are labeled with "VDD" receive power from voltage regulator 638. Voltage regulator 638 receives power from permanent battery 636, which is permanently connected to the dispenser circuitry. Replaceable power source 620 is secured to a refill unit (not shown) and releasably connects to voltage regulator 639 through replaceable power source interface receptacle 644, which supplies power to boost circuitry 646 and rechargeable batteries 645 when the refill unit is installed in the dispenser and in circuit communication with power system 600. Rechargeable batteries 645 may be a single battery or multiple batteries, and in one embodiment are two NIMH rechargeable batteries. Multiple batteries are preferably connected in parallel, but may be connected in series. The physical connection between voltage regulator 639 and boost circuitry 646 is not shown for purposes of clarity and is denoted as input "VB." In some embodiments, dispenser system 600 also includes a dispenser status indicator 670.

In this exemplary embodiment, processor 632 is a microprocessor part no. R5F1026A, object sensor emitter 642A is an infrared emitter, object sensor receiver 642B is an infrared receiver, header 634 is 4-pin in circuit programmer, voltage regulators 638, 639 are single-cell dual output high-efficiency charge pumps, part no. TPS60310, actuator drive circuitry 648 includes a mosfet H-bridge part no. ZXMHC3F381N8SO8, permanent battery 636 is a size "C" battery and door circuitry 640 is magnetic door switch.

Boost circuitry 646 includes a low voltage input 646A, an inductor 646B, a diode 646C, a transistor 646D, a boosted voltage output 646E, and a capacitor 646F arranged as illustrated in FIG. 6A. During operation, boost circuitry 646 has a low voltage input 646A from the regulated voltage of replaceable power source 620 and rechargeable batteries 645. The boost circuitry 646 relies on the tendency of an inductor 646B to resist changes in current which allows the output voltage 646E of the boost circuit 646 to be higher than the input voltage 646A.

In the present case, the output voltage 646E is about 4.1 volts while the input voltage 646A is about 2 to 2.25 volts. When transistor 646D is closed, current flows through the inductor 646B in a first direction and the inductor 646B stores energy. The polarity of the side of the inductor 646B by the low voltage input 646A is positive. When the switch is opened, the current will be reduced as the impedance is higher. The change or reduction in current will be opposed by the inductor 646B. The polarity will be reversed, meaning the side by the low voltage input 646A will be negative. As a result, the low voltage input 646A and inductor 646B will be in series causing a higher combined voltage to charge the capacitor 646F through the diode 646C. The switch is cycled fast enough so that the inductor 646B does not fully discharge between charging stages. The voltage output 646E, which is connected to actuator drive circuitry 648 to drive the motor and associated gearing to dispense the pump, is a voltage that is greater than that of the low voltage input 646A.

When the transistor 646D is open, the capacitor 646F is charged to the higher voltage and the higher voltage is provided to the actuator drive circuitry 648. When the transistor 646D closes, the capacitor 646F continues to provide the higher voltage to the actuator drive circuitry 648. The diode 646C prevents the capacitor 646F from discharging through transistor 646D when transistor 646D is closed. The transistor 646D is opened fast enough to prevent the capacitor 646F from discharging too much. This cycle is repeated during the duration that the actuator drive circuitry 648 is driving the motor and associated gearing. Accordingly, the voltage regulator 639, rechargeable batteries 645 and the boost circuit 646 allow low voltage replaceable power source 620 supplied by the refill unit to provide a high enough voltage to operate the actuator drive circuitry 648.

The embodiments disclosed herein eliminate the need for a maintenance personnel to check the battery status of dispensers and to have to stock and replace batteries in dispensers when the dispenser batteries run low of power. The refill units are supplied with a small battery having a low voltage. The small battery is referred to herein as a replaceable battery or replaceable power source because the battery or power supply is replaced with the refill unit. The power systems disclosed herein increase the voltage provided by the replaceable power source to provide a high enough voltage to operate the actuating mechanism and dispense a dose of product. Thus, maintenance personnel need only replace the refill unit when the refill unit is empty, and the dispenser rechargeable battery is automatically recharged.

In some embodiments, refill units 110, 410 include an identification circuitry, such as, for example, an RFID chip (not shown). The RFID chip may contain an authentication code. When the refill units 110, 410 are inserted in dispensers 100, 400, dispensers 100, 400 use identification circuitry (not shown), such as, for example, an RFID reader to read the authentication code. If the code matches a pre-stored code, the dispensers 100, 400 operate as described above. If, however, the code does not match, or no code is identified, the dispensers 100, 400 take another course of action, such as, for example, not operating, prematurely draining the battery in the refill unit leaving the refill unit at least partially full of liquid, or causing the actuator to dispense the contents of the refill unit even though no object is detected by object sensors 142, 442.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

We claim:

1. An electronic dispenser comprising:
   a housing;
   a processor;
   a first battery secured to the dispenser; the first battery providing power to the processor;
   actuator drive circuitry for causing the dispenser to operate an actuator motor;
   a rechargeable energy storage device, separate from the first battery, for providing power to the actuator drive circuitry and the actuator motor;
   circuitry for charging the rechargeable energy storage device;
   a holder for holding a refill unit; and
   a connector for releasably connecting to a second battery that is secured to a refill unit when a refill unit is installed in the dispenser and disconnecting from a second battery when a refill unit is removed from the dispenser;
   wherein the voltage of the second battery is less than the voltage required for the actuator drive circuitry to operate a pump on the refill unit.

2. The electronic dispenser of claim 1 wherein the rechargeable energy storage device for providing power to the actuator drive circuitry is a plurality of capacitors.

3. The electronic dispenser of claim 2 further comprising circuitry for placing the plurality of capacitors in parallel to charge the capacitors and circuitry for placing the plurality of capacitors in series to provide power to the actuator drive circuitry.

4. The electronic dispenser of claim 1 wherein the rechargeable energy storage device for providing power to the actuator drive circuitry is one or more rechargeable batteries.

5. The electronic dispenser of claim 4 further comprising circuitry for boosting the voltage of the one or more rechargeable batteries to provide power to the actuator drive circuitry.

6. The electronic dispenser of claim 5 wherein boost circuitry boosts the voltage from about 2 volts to over about 4 volts.

7. The electronic dispenser of claim 1 further comprising the refill unit and the second battery secured to the refill unit.

8. The electronic dispenser of claim 1 wherein the first battery for supplying power to the processor is permanently affixed to the dispenser.

9. The electronic dispenser of claim 1 further comprising circuitry to charge the rechargeable device to a charge that is less than the full capacity of the rechargeable device.

10. The electronic dispenser of claim 9 wherein the circuitry for charging the rechargeable energy storage device charges the rechargeable device to less than about 75% of capacity.

11. The electronic dispenser of claim 9 wherein the circuitry for charging the rechargeable energy storage device charges the rechargeable device to less than about 50% of capacity.

12. The electronic dispenser of claim 1 further comprising circuitry to determine that a refill unit is depleted and circuitry to deplete the charge in the second battery secured to the refill unit when it is detected that the refill unit is depleted.

13. An electronic dispenser comprising:
a housing;
actuator drive circuitry for driving a pump;
a processor;
a first power source for powering the processor;
a plurality of capacitors;
capacitor control circuitry for charging the plurality of capacitors in parallel and
for placing the plurality of capacitors in series to power the actuator charge circuitry; and
circuitry for electrically coupling to a second battery that is secured to and removable with a refill unit,
wherein the second battery supplies the power to charge the plurality of capacitors.

14. The electronic dispenser of claim 13 further comprising the refill unit having the second battery.

15. An electronic dispenser comprising:
a housing configured to receive a refill unit, the refill unit having
a container for holding a fluid,
a pump for pumping fluid from the container, and
a disposable battery provided with the refill unit; and
an electrically operated actuator to operate the pump of the refill unit,
wherein the disposable battery of the refill unit has an initial voltage that is less than the voltage required to operate the electrically operated actuator.

16. The electronic dispenser of claim 15 wherein the disposable battery is a single "AA" sized battery.

17. The electronic dispenser of claim 15 wherein the disposable battery has a voltage of less than about 3 volts.

18. The electronic dispenser of claim 15 further comprising liquid in the refill unit.

19. The electronic dispenser of claim 15 further comprising a processor powered by a battery installed in the dispenser that is not removable with the refill unit.

* * * * *